ed here_

UNITED STATES PATENT OFFICE.

THEODORE CRAMP WESTER, OF BALTIMORE, MARYLAND.

SEALING COMPOSITION.

1,341,490.　　　　Specification of Letters Patent.　　Patented May 25, 1920.

No Drawing.　　Application filed November 14, 1919. Serial No. 338,081.

*To all whom it may concern:*

Be it known that I, THEODORE CRAMP WESTER, a citizen of the United States, residing at Baltimore, in the State of Maryland, have invented certain new and useful Improvement in Sealing Compositions, of which the following is a specification.

This invention relates to a composition of matter and is especially useful as a packing to insure the hermetic sealing of sheet metal cans, particularly those used for preserving food products. It is especially intended for use in connection with what are known as "sanitary" cans, in which no solder is employed, but the heads are secured to the bodies by a folding and pressing operation known as "double seaming," thus forming an interlocking joint. It may be employed for the can bottom, which is applied, while the can is empty, as well as for the top, which is put on, of course, after the can has been filled with the food product, and sterilized or "processed." The composition, which is of a thick, sticky, elastic semi-liquid nature, is applied as a coating to one or both of the engaging surfaces, and thus forms a yielding seat to compensate for slight irregularities in the metal.

While compositions of this general character have heretofore been proposed, it is the object of the present invention to provide an improved plastic composition which will retain its elasticity over an extended period; which will be exceptionally smooth and homogeneous, thus increasing the number of cans sealed per gallon and insuring complete uniformity; and which will be unaffected by water, food juices, steam, dry heat, cold, pressure, or any other conditions met with during the canning process or subsequent storage. A further object is to provide means for insuring against the possibility of introducing bacteria into the can through the medium of the sealing compound.

My improved composition, when solidified, forms a flexible, elastic, non-drying, adhesive, insoluble, odorless and tasteless gasket or seal between the can heads and bodies, thus absolutely preventing leakage of the contents, and protecting such contents against all external influences.

The base of the improved compound consists of rubber dissolved in some suitable volatile solvent, such as naphtha. In order, however, to preserve the softness and elasticity of this rubber solution and prevent it from becoming hard, "set" or brittle, I employ as a softening agent, a suitable proportion of gutta-siak, or gutta-siak with resin or with a vegetable oil, such as china-wood oil, or any combination of these materials.

In addition to increasing the "life" and elasticity of the rubber, the above substances increase the adhesiveness and spreading qualities of the plastic composition.

I have also found that the sealing qualities of the composition of matter are improved by the addition of a small amount of sodium silicate. This material acts to form a film at the surface of the gasket and tends to absorb any liquid due to a minute leak.

In order to color, or to give body to the composition, I preferably add a filler, such as a suitable pigment or powdered French or domestic chalk, the proportions of which may be varied as desired.

Heretofore where trouble has been experienced by reason of the fermentation of carefully sterilized, processed, and sealed cans, it has probably been caused by the introduction of bacteria into the can through the medium of the sealing compound itself. While such bacteria would be rendered dormant by the solvent employed, still, after the evaporation of such volatile solvent, the bacteria may become active again and set up fermentation within the can. In order to avoid any possibility of the occurrence of such fermentation, I propose to embody a germicide or preservative in the sealing compound itself. While other substances may be employed, I prefer the use of a small percentage of sodium benzoate, which, as is well known, is harmless when taken into the human system in very small quantities. The presence of such a substance in the plastic composition effectively prevents the development of bacteria in the same, and thus protects the contents of the can from contamination in this way.

While, as above indicated, the ingredients and proportions may be widely varied, I find that the following formula gives excellent results:

| | | |
|---|---|---|
| Solvent | 100 | gals. |
| Rubber | 17.5 | lbs. |
| Gutta-siak, alone, or with china-wood, or resin, or both, total weight | 4.15 | " |
| Sodium silicate (saturated solution) | 1.66 | " |
| French or domestic chalk or pigment or mixtures thereof | 2.25 | " |
| Sodium benzoate | 0.7 | " |

In preparing the improved plastic composition I first dissolve the rubber in the solvent, and then add gutta-siak, alone, or with oil or resin, or mixtures thereof, in a liquid state. The sodium silicate solution may then be added and chalk or other filling material stirred in, the sodium benzoate being finally incorporated. The whole is thoroughly mixed so as to form a smooth, homogeneous pasty liquid.

The use of gutta-siak, sometimes commercially known as "book-gutta," is of special value in my can-sealing composition. This material is a firm, tough and elastic gum found in the East Indies, and is a member of the gutta family. By the addition of this material to the can sealing composition the hardness of the same may be controlled and the valuable properties of adhesiveness and residual elasticity are imparted to the mass. Further, when forced under compression, or when compressed during the double-seaming operation, there is a tendency for the material to "creep" or work from its original position of adhesion either toward the outer or inner periphery of the annular groove of the can ends, and in this event, the gutta-siak admits of this "creeping" without partition. Moreover, when "creeping" or spreading takes place the gutta-siak causes adhesion to the new surface with which it comes into contact and also allows a uniform spread over the entire surface.

What I claim is:

1. A plastic composition comprising a rubber solution, and gutta-siak.
2. A plastic composition comprising a rubber solution, gutta-siak and a vegetable oil.
3. A plastic composition comprising a rubber solution, gutta-siak and china-wood oil.
4. A plastic composition comprising a rubber solution, gutta-siak, china-wood oil, and resin.
5. A plastic composition comprising a rubber solution, gutta-siak and a filler.
6. A plastic composition comprising a rubber solution, a filler, and a softening agent which includes gutta-siak and a drying vegetable oil.
7. A can-sealing composition comprising rubber dissolved in a solvent, gutta-siak and a germicide.
8. A can-sealing composition comprising a rubber solution, gutta-siak and sodium benzoate.
9. A can-sealing composition comprising a rubber solution, gutta-siak and sodium silicate.
10. A can-sealing composition comprising a rubber solution, gutta-siak, sodium silicate and a germicide.
11. A can-sealing composition comprising a rubber solution, gutta-siak, sodium silicate, a filler and a germicide.
12. A can-sealing composition comprising a rubber solution, gutta-siak and a pigment.
13. A plastic composition comprising a rubber solution, gutta-siak, a pigment and a germicide.

In testimony whereof I affix my signature.

THEODORE CRAMP WESTER.